United States Patent [19]
Kreitzer

[11] Patent Number: 6,141,154
[45] Date of Patent: Oct. 31, 2000

[54] FOCUSABLE, COLOR CORRECTED, HIGH PERFORMANCE PROJECTION LENS SYSTEMS

[75] Inventor: Melvyn H. Kreitzer, Cincinnati, Ohio

[73] Assignee: U.S. Precision Lens Inc., Cincinnati, Ohio

[21] Appl. No.: 09/137,279

[22] Filed: Aug. 20, 1998

Related U.S. Application Data

[60] Provisional application No. 60/056,675, Aug. 22, 1997.

[51] Int. Cl.$^7$ ..................................................... G02B 3/00
[52] U.S. Cl. .......................................... 359/651; 359/649
[58] Field of Search .................................... 359/649, 650, 359/651

[56] References Cited

U.S. PATENT DOCUMENTS

| | | |
|---|---|---|
| 4,300,817 | 11/1981 | Betensky . |
| 4,348,081 | 9/1982 | Betensky . |
| 4,526,442 | 7/1985 | Betensky . |
| 4,682,862 | 7/1987 | Moskovich . |
| 4,697,892 | 10/1987 | Betensky . |
| 4,755,028 | 7/1988 | Moskovich . |
| 4,761,063 | 8/1988 | Yoshida et al. .......................... 350/432 |
| 4,776,681 | 10/1988 | Moskovich . |
| 4,801,196 | 1/1989 | Betensky . |
| 4,815,831 | 3/1989 | Betensky . |
| 4,838,670 | 6/1989 | Ueda et al. ............................ 350/432 |
| 4,900,139 | 2/1990 | Kreitzer . |
| 4,963,007 | 10/1990 | Moskovich . |
| 5,055,922 | 10/1991 | Wessling . |
| 5,130,850 | 7/1992 | Toide . |
| 5,148,320 | 9/1992 | Toide . |
| 5,237,456 | 8/1993 | Yoshioka . |
| 5,296,967 | 3/1994 | Moskovich . |
| 5,309,283 | 5/1994 | Kreitzer . |
| 5,329,363 | 7/1994 | Moskovich . |
| 5,404,246 | 4/1995 | Kaneko et al. . |
| 5,455,713 | 10/1995 | Kreitzer . |
| 5,808,804 | 9/1998 | Moskovich . |
| 5,936,776 | 8/1999 | Kreitzer . |

FOREIGN PATENT DOCUMENTS

| | | |
|---|---|---|
| WO 97/41477 | 11/1997 | WIPO . |
| WO 99/03006 | 1/1999 | WIPO . |

*Primary Examiner*—Scott J. Sugarman
*Assistant Examiner*—Tim Thompson
*Attorney, Agent, or Firm*—Maurice M. Klee

[57] ABSTRACT

Focusable, color corrected, high performance projection lens systems are provided which include three lens units (U1, U2, U3), the first lens unit being composed of two subunits ($U_{S1}$, $U_{S2}$). The lens systems can have f/190's less than 1.0, total fields of as much as 90°, low vignetting losses, and MTF values greater than 0.5 at 10 cycles/mm through 0.85 of the full field. By varying the space between the first and second lens units, these performance levels can be maintained as the lens system is focused over a range of conjugates of approximately ±7.5% from a center value of about 4 meters. The lens systems can be used in such demanding applications as flight simulators.

20 Claims, 3 Drawing Sheets

FOCUSABLE, COLOR CORRECTED, HIGH PERFORMANCE PROJECTION LENS SYSTEMS

CROSS REFERENCE TO RELATED PROVISIONAL APPLICATION

This application claims the benefit under 35 USC §119(e) of U.S. Provisional Application No. 60/056,675 filed Aug. 22, 1997, the content of which in its entirety is hereby incorporated by reference.

FIELD OF THE INVENTION

This invention relates to projection lens systems for use in projection television systems and, in particular, to focusable, color corrected, high performance projection lens systems for use in such applications as flight simulators.

BACKGROUND OF THE INVENTION

Projection lens systems for cathode ray tube (CRT) projection televisions have undergone continuing development during the past fifteen years or so. Examples of such systems can be found in Betensky, U.S. Pat. Nos. 4,300,817, 4,348,081, 4,526,442, 4,697,892, and 4,801,196; Moskovich, U.S. Pat. Nos. 4,682,862, 4,755,028, and 4,776,681; and Toide, U.S. Pat. No. 5,148,320.

Color images for projection televisions are normally obtained by combining images from three color CRTs, i.e., a red CRT, a green CRT, and a blue CRT. The phosphors used in commercially available CRTs do not emit light at a single wavelength. In particular, green phosphors have significant sidebands in blue and red. Similar polychromaticity exists for red and blue phosphors, but to a lesser extent.

For many consumer applications, lens systems uncorrected for color can be used, notwithstanding the color spread of the CRTs. For more demanding applications, however, such as high definition television, data displays, or systems which operate at a high magnification, color correction is needed to avoid visible color fringing and/or a loss of image contrast. Examples of projection lens systems which provide at least some color correction include Betensky, U.S. Pat. No. 4,815,831; Kaneko et al., U.S. Pat. No. 5,404,246; Kreitzer, U.S. Pat. Nos. 4,900,139, 5,309,283, and 5,455,713; Moskovich, U.S. Pat. No. 4,963,007; Toide, U.S. Pat. No. 5,130,850; and Yoshioka, U.S. Pat. No. 5,237,456.

A particularly demanding application for projection televisions is in the area of simulators, e.g., flight simulators, where the goal is to produce an image which mimics real life as closely as possible. Performance requirements for such systems can include an f/# of less than 1.0, a total field in the direction of the image (screen) of as much as 90°, full color correction over the 465 to 610 nanometer range, and a modulation transfer function (MTF) greater than 50% at 10 cycles/millimeter through 0.85 of the total field.

In addition, to enhance the brightness of the image, it is desirable to achieve these performance characteristics for relatively large CRTs, e.g., CRTs which have a diagonal on the order of 160 millimeters. Along these same lines, it is desirable to minimize vignetting of the light passing through the projection lens system so as to increase the amount of light which reaches the viewing screen, e.g., it is desirable to keep vignetting losses below 30% at full field. As known in the art, vignetting can be used in the design of an optical system to remove off-axis rays which if allowed to reach the screen would degrade the quality of the image. Minimizing vignetting thus puts even higher demands on the basic performance of the lens system since with vignetting minimized, more rays reach the screen and thus must be corrected.

In addition to these considerations, the projection lens system should be focusable over a range of conjugates, e.g., a range of approximately ±7.5% from a center value of about 4 meters. Such focusability provides flexibility in the types of applications in which the system can be used and in the set-up procedure for any particular installation. The lens system, of course, must continue to meet the above performance characteristics as it is focused over such a conjugate range.

Although of high quality, the existing projection lens systems are not able to meet all of the above criteria. There thus exists a need in the art for an improved projection lens system which is capable of satisfying these criteria. It is an object of the present invention to provide such a lens system.

SUMMARY OF THE INVENTION

To achieve the above and other objects, the invention provides a projection lens system for use with a cathode ray tube, said lens system having an overall optical power $\Phi_0$ and comprising in order from the system's image side (long conjugate side):

(a) a first lens unit having an optical power $\Phi_1$ and comprising in order from the system's image side a first lens subunit having an optical power $\Phi_{S1}$ and a second lens subunit having an optical power $\Phi_{S2}$;

(b) a second lens unit having an optical power $\Phi_2$; and (c) a third lens unit which has an optical power $\Phi_3$, is associated with the cathode ray tube during use of the lens system, and provides correction to the field curvature of the lens system;

wherein each of the first, second, and third lens units has at least one aspherical surface and wherein $\Phi_1$, $\Phi_{S1}$, $\Phi_{S2}$, $\Phi_2$, and $\Phi_3$ satisfy the following conditions:

(i) $\Phi_1 > 0$;
(ii) $\Phi_1/\Phi_0 < 0.3$;
(iii) $\Phi_{S1} < 0$;
(iv) $|\Phi_{S1}|\Phi_0 > 0.4$;
(v) $\Phi_{S2} > 0$;
(vi) $\Phi_{S2}/\Phi_0 > 0.3$;
(vii) $\Phi_2 > 0$;
(viii) $\Phi_2/\Phi_0 > 0.4$; and
(ix) $\Phi_3 < 0$.

In certain preferred embodiments, the first lens subunit comprises a bi-concave lens element made of glass. In other preferred embodiments, the first and second lens units are separated by an axial space which is varied during focusing of the lens system to stabilize the quality of the image.

The foregoing drawings, which are incorporated in and constitute part of the specification, illustrate preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The lens systems of the invention preferably include a first lens unit (U1), a second lens unit (U2), and a third lens unit (U3) wherein: 1) the first lens unit includes a first lens subunit ($U_{S1}$) having a relatively strong negative optical power and a second lens subunit having a relatively strong positive optical power ($U_{S2}$); 2) the second lens unit provides axial color correction and has a strong positive optical power; and 3) the third lens unit corrects for the field curvature of the lens system and has a relatively strong negative optical power.

Figure 1:
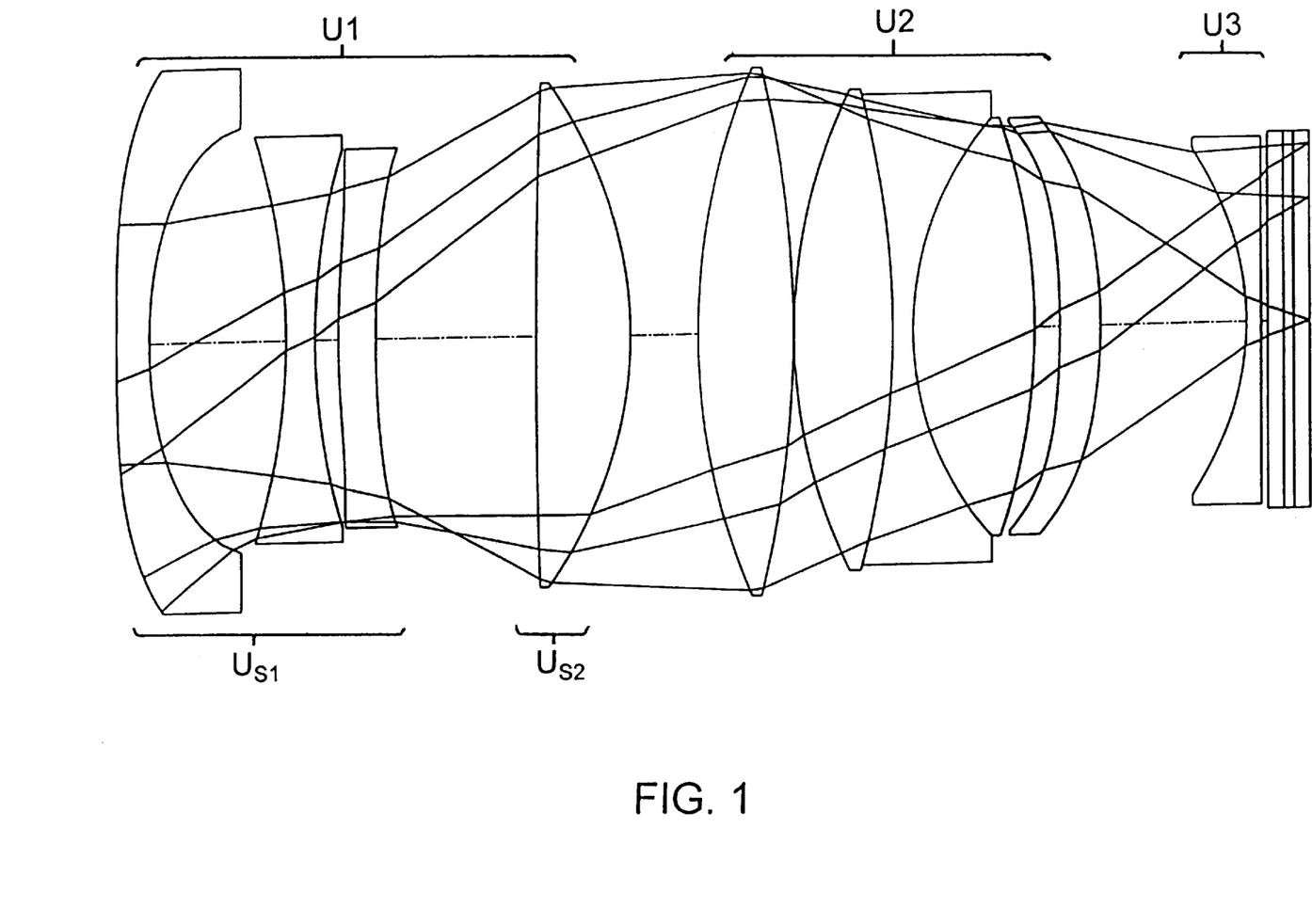
FIGS. 1 and 2 are schematic side views of lens systems constructed in accordance with the invention.
Figure 2:
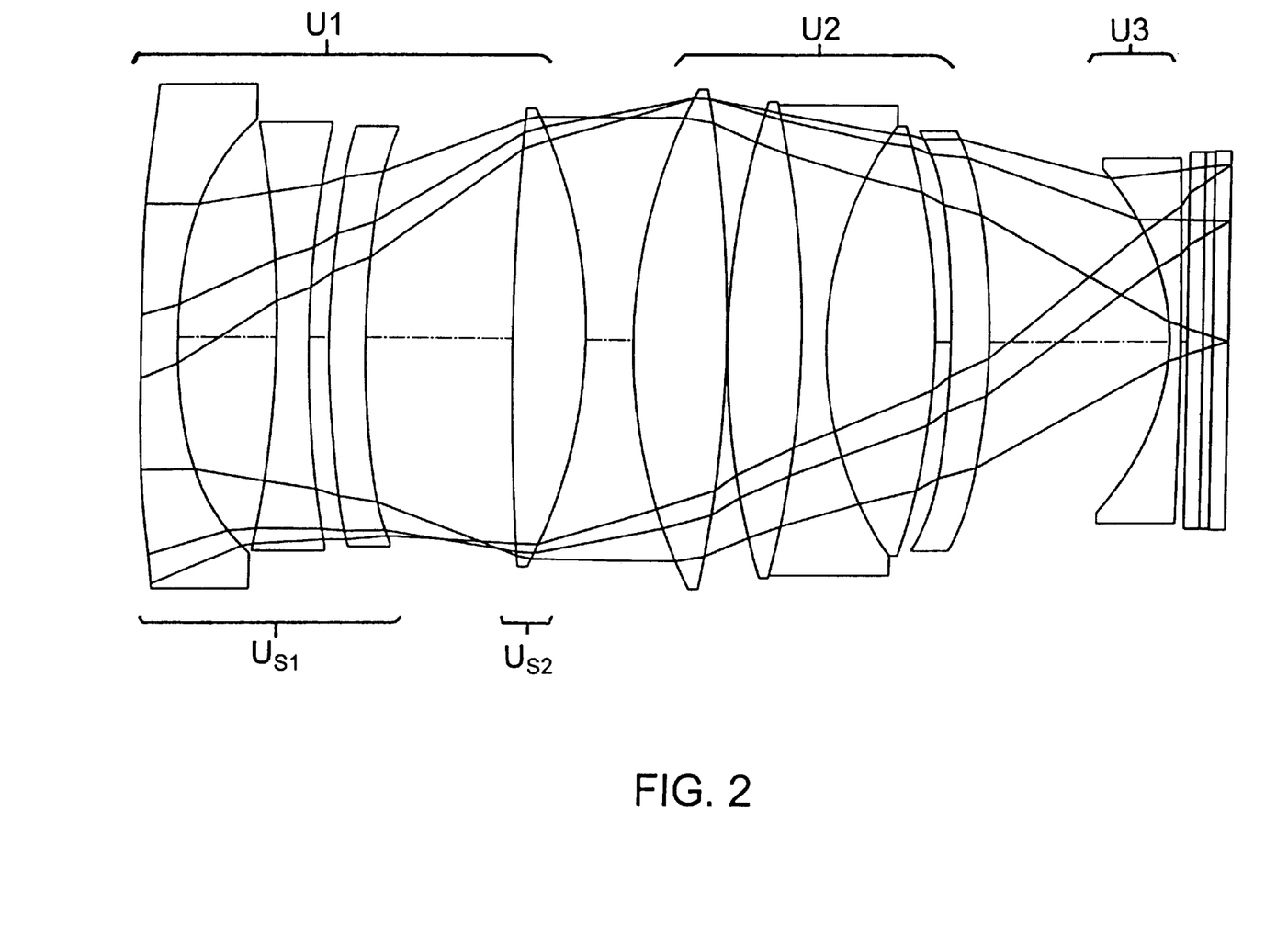

Each lens unit and subunit can be composed of one or more lens elements. For example, as shown in FIGS. 1 and 2, the second lens subunit and the third lens unit each consist of a single lens element, while the first lens subunit and the second lens unit comprise multiple lens elements having both positive and negative powers. The positive and negative lens elements of the second lens unit have appropriate optical dispersions and powers to provide axial color correction for the lens system.

As discussed above the first lens subunit preferably includes a biconcave lens element composed of glass. The use of such an element facilitates thermal compensation for the lens system (see below).

Each lens unit includes at least one lens element which has at least one aspherical surface. Such aspherical lens elements are preferably composed of plastic materials, e.g., acrylic polymers. If desired, one of the aspherical plastic lens elements can include an absorptive color filter material in accordance with Wessling, U.S. Pat. No. 5,055,922.

The use of plastic lens elements has the drawback that the refractive index of plastic optical materials changes significantly with temperature. Another effect is the change in shape, i.e., expansion or contraction, of such materials with temperature. This latter effect is usually less significant than the change in index of refraction.

To address this problem and to also compensate for the thermal changes in the plastic or aluminum mechanical components of the system, e.g., the lens barrel which is usually the major mechanical source of thermally-caused focus changes, the lens systems of the invention are preferably athermalized so as to take into account the location and power of the plastic lens elements, as well as the marginal ray heights at those elements.

The location of the plastic lens elements is significant in terms of the amount of temperature change the element will undergo and thus the amount of change which will occur in the element's index of refraction. In general, elements closer to the CRT undergo greater temperature changes. In practice, a temperature distribution in the region where the projection lens is to be located is measured with the CRT operating and those measured values are used in the design of the projection lens. The marginal ray height at a particular plastic lens element determines, for a given thermal change, whether changes in the element's index of refraction will be significant with regard to the overall thermal stability of the lens. Elements for which the marginal ray height is small will in general have less effect on the overall thermal stability of the system than elements for which the marginal ray height is large.

Based on the foregoing considerations, athermalization of the projection lenses of the invention is achieved by: (1) using low powered plastic lens elements at locations where the marginal ray height is large and the temperature change is large, i.e., in the second lens unit; and (2) using high powered plastic lens elements at locations where either the marginal ray height or the temperature change is small, i.e., in the first lens subunit and the third lens unit. It is also desirable for the plastic elements to have a net positive power.

The level of athermalization achieved is preferably optimized using a computerized lens design program as follows. First, a ray trace is performed at a first temperature distribution and a performance parameter, e.g., image distance, is calculated. The ray trace can be a paraxial ray trace for the marginal ray. Second, the same ray trace is performed at a second temperature distribution and the performance parameter is again calculated. Neither the first nor the second temperature distribution need be constant over the entire lens but can, and in the typical case does, vary from lens element to lens element. The calculated values of the performance parameter are then constrained to a constant value as the design of the system is optimized using the lens design program.

It should be noted that the foregoing approach assumes that the mechanical mounts for the projection lens and the CRT hold the distance between the last lens surface and the CRT substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the CRT, can be assumed to be mechanically fixed.

Focusing of the lens system for different conjugates is preferably achieved by moving the entire lens system relative to the CRT. The axial space between the first and second lens units is then adjusted to maintain the high performance levels of the lens. As can be seen in FIGS. 1 and 2, the marginal rays are substantially horizontal between the first and second lens units so that small variations in the length of this space will not substantially change the overall focus of the system. In this way, aberration fine tuning, e.g., astigmatism reduction, can be achieved by varying this space while leaving the overall focus of the system essentially unchanged.

FIGS. 1 and 2 illustrate projection lenses constructed in accordance with the invention. Corresponding prescriptions appear in Tables 1 and 2, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1 and 2.

The designation "a" associated with various surfaces in the tables represents an aspheric surface, i.e., a surface for which at least one of D, E, F, G, H, or I in the above equation is not zero. The designation "c" represents a conic surface, i.e., a surface for which k in the above equation is not zero. All dimensions given in the tables are in millimeters. The tables are constructed on the assumption that light travels from left to right in the figures. In actual practice, the viewing screen will be on the left and the CRT will be on the right, and light will travel from right to left.

In Tables 1 and 2, the first lens unit comprises surfaces 1–9, the second lens unit comprises surfaces 10–18, the third lens unit comprises surfaces 19–20, and the CRT comprises surfaces 21–24, with the object which is projected onto the screen being the inner surface of the CRT faceplate. The first and second subunits of the first lens unit comprise surfaces 1–6 and 8–9, respectively, in both tables. The material designations 420550 and 539570 set forth in the tables represent the index of refraction and dispersion characteristics of a cover plate and fluid layer applied to the CRT's faceplate. Specifically, a $N_e$ value for the material is obtained by adding 1,000 to the first three digits of the designation, and a $V_e$ value is obtained from the last three digits by placing a decimal point before the last digit.

Table 3 summarizes the powers of the various lens units and subunits of the lens systems of FIGS. 1 and 2, and Table 4 summarizes their performance properties. As can be seen in these tables, lens systems have the structure defined by conditions (i) through (ix) above have the f/#, total field, vignetting, and MTF properties needed for use in simulator applications. Note that the f/# values given in Table 4 are for finite conjugates; for a long conjugate of infinite length, the f/# of both the lens system of Table 1 and that of Table 2 is less than 1.0.

In addition to the properties listed in Table 4, the lens systems of FIGS. 1 and 2 are also fully color corrected over the 465–610 nanometer range. Moreover, these lens systems can be focused over a range of conjugates of approximately ±7.5% from a center value of about 4 meters while maintaining the required high performance levels for simulator applications (see Tables 1 and 2 for focus ranges).

Figure 3:
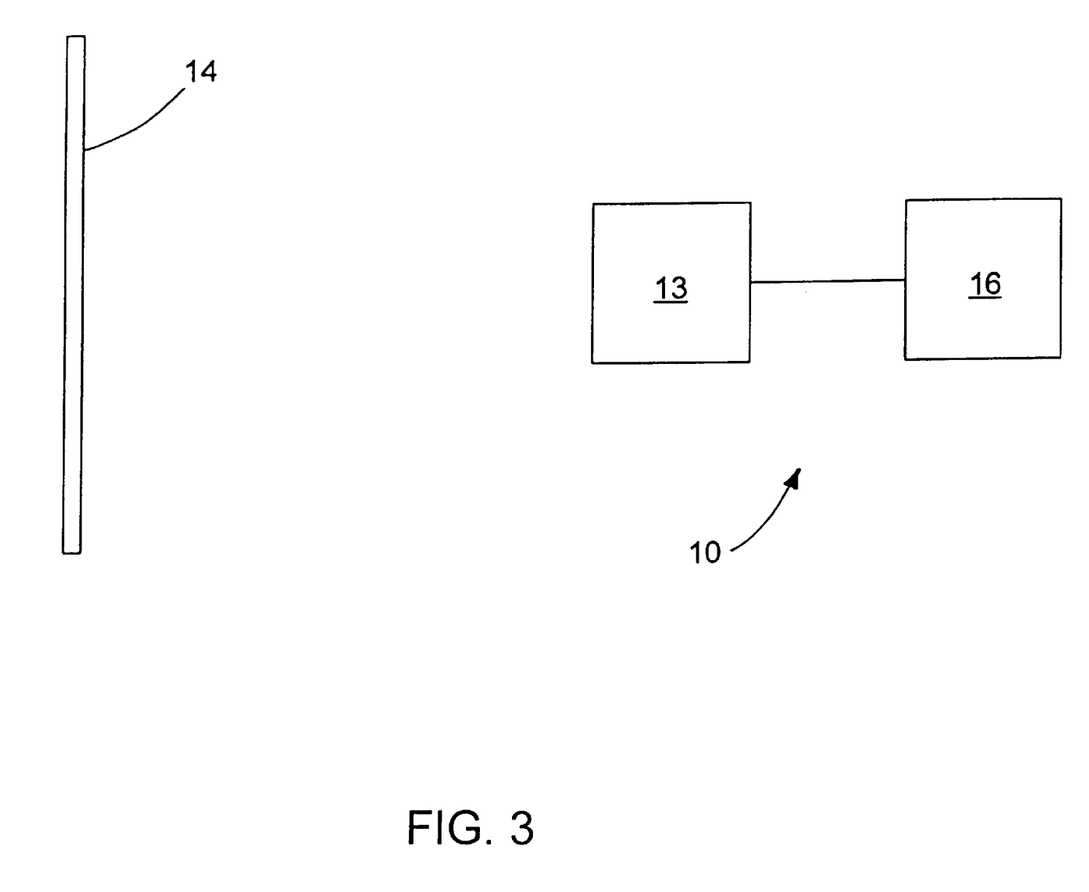
FIG. 3 is a schematic diagram of a front projection TV employing a lens system constructed in accordance with the invention.

FIG. 3 is a schematic diagram of a front projection television system 10 constructed in accordance with the invention. In this figure, module 13 schematically illustrates a projection lens system constructed in accordance with the invention and module 16 schematically illustrates its associated CRT tube. In practice, three lens systems 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 2901.1860 | 15.00000 | ACRYLIC | 238.00 |
| 2 | ac | 209.1157 | 60.46000 | | 184.25 |
| 3 | | −296.4704 | 13.00000 | FC5 | 174.26 |
| 4 | | 296.4704 | 10.00000 | | 161.54 |
| 5 | ac | 392.6675 | 16.00000 | ACRYLIC | 161.29 |
| 6 | a | 540.9802 | 67.72000 | | 161.88 |
| 7 | | Aperture stop | 1.91000 | | 209.12 |
| 8 | | 3148.5892 | 41.00000 | BACD18 | 213.21 |
| 9 | | −189.1711 | Space 1 | | 216.25 |
| 10 | | 287.1786 | 42.50000 | BACD18 | 226.61 |
| 11 | | −473.3888 | 0.39000 | | 225.40 |
| 12 | | 233.4301 | 44.00000 | BACD5 | 206.27 |
| 13 | | −400.1245 | 0.05000 | | 201.84 |
| 14 | | −398.7020 | 9.00000 | FD6 | 201.83 |
| 15 | | 135.8890 | 53.87000 | BSC7 | 178.59 |
| 16 | | −287.2871 | 11.20000 | | 177.52 |
| 17 | a | −408.5138 | 17.50000 | ACRYLIC | 174.84 |
| 18 | ac | −233.0149 | 64.47000 | | 178.30 |
| 19 | a | −119.5886 | 6.79000 | ACRYLIC | 152.00 |
| 20 | | −29999.9997 | Space 2 | | 157.00 |
| 21 | | ∞ | 7.00000 | BAC1 | 161.00 |
| 22 | | ∞ | 4.30000 | 420550 | 161.00 |
| 23 | | ∞ | 7.00000 | 539570 | 161.00 |
| 24 | | ∞ | 0.0 | | 161.00 |

| Symbol Description | | |
|---|---|---|
| a | - | Polynomial asphere |
| c | - | Conic section |

| Object and Image Surface | |
|---|---|
| Surface | Radius |
| Image | 3657.00 |

| Conics | |
|---|---|
| Surface Number | Constant |
| 2 | 4.0000E+00 |
| 5 | −2.5000E+01 |
| 18 | −6.1068E+00 |

TABLE 1-continued

Even Polynomial Aspheres

| Surf. No. | D | E | F | 0 | H | I |
|---|---|---|---|---|---|---|
| 1 | 1.5357E−07 | −1.1470E−11 | 5.4733E−16 | 1.8080E−20 | −2.4692E−24 | 7.0415E−29 |
| 2 | 1.0916E−07 | −9.1896E−12 | −4.4716E−16 | 7.3390E−20 | 4.1308E−24 | −6.1243E−28 |
| 5 | −5.5549E−08 | −2.0289E−11 | 1.1519E−15 | 2.4383E−19 | −1.9504E−23 | 1.3099E−27 |
| 6 | 6.9500E−08 | −1.1849E−11 | 1.1142E−15 | 1.0660E−19 | −3.1801E−24 | −3.9466E−28 |
| 17 | −8.0884E−08 | −1.2768E−11 | −5.5910E−16 | −1.8983E−20 | 4.4793E−24 | 5.0401E−28 |
| 18 | −5.2904E−08 | −1.2418E−11 | −9.2265E−16 | 6.0394E−20 | 5.7518E−24 | −9.2069E−29 |
| 19 | 7.6271E−08 | 4.4580E−11 | −3.4805E−14 | 9.6328E−18 | −1.1505E−21 | 5.2675E−26 |

Variable Spaces

| Pos. | Space 1 T(9) | Space 2 T(20) |
|---|---|---|
| 1 | 29.300 | 2.520 |
| 2 | 30.300 | 3.000 |

| First-Order Data | Pos. 1 | Pos. 2 |
|---|---|---|
| f/number | 0.99 | 0.99 |
| Magnification | −0.0270 | −0.0320 |
| Object Height | −2664.0 | −2345.0 |
| Object Distance | −3876.02 | −3264.13 |
| Effective Focal Length | 105.815 | 105.858 |
| Overall Length | 4401.00 | 3790.58 |
| Forward Vertex Distance | 524.985 | 526.455 |
| Barrel Length | 524.980 | 526.460 |
| Stop Surface Number | 7 | 7 |
| Distance to Stop | 0.00 | 0.00 |
| Stop Diameter | 207.93 | 209.05 |
| Entrance Pupil Distance | 116.310 | 116.310 |
| Exit Pupil Distance | −168.605 | −169.832 |

First Order Properties of Elements

| Element Number | Surface Numbers | | Power | f' |
|---|---|---|---|---|
| 1 | 1 | 2 | −0.21870E−02 | −457.24 |
| 2 | 3 | 4 | −0.33235E−02 | −300.88 |
| 3 | 5 | 6 | 0.35704E−03 | 2800.8 |
| 4 | 8 | 9 | 0.35764E−02 | 279.61 |
| 5 | 10 | 11 | 0.35094E−02 | 284.95 |
| 6 | 12 | 13 | 0.39082E−02 | 255.87 |
| 7 | 14 | 15 | −0.80789E−02 | −123.78 |
| 8 | 15 | 16 | 0.53783E−02 | 185.93 |
| 9 | 17 | 18 | 0.94037E−03 | 1063.4 |
| 10 | 19 | 20 | −0.41122E−02 | −243.18 |

First-Order Properties of Doublets

| Element Numbers | | Surface Numbers | | Power | f' |
|---|---|---|---|---|---|
| 7 | 8 | 14 | 16 | −0.21287E−02 | −469.76 |

TABLE 2

| Surf. No. | Type | Radius | Thickness | Glass | Clear Aperture Diameter |
|---|---|---|---|---|---|
| 1 | a | 23000.0007 | 16.00000 | ACRYLIC | 221.00 |
| 2 | ac | 244.4418 | 43.00000 | | 186.00 |
| 3 | | −489.7119 | 14.00000 | FC5 | 183.82 |
| 4 | | 489.7119 | 8.90000 | | 180.18 |
| 5 | ac | 341.6551 | 16.00000 | ACRYLIC | 180.27 |
| 6 | a | 460.3655 | 62.55000 | | 176.99 |
| 7 | | Aperture stop | 1.70000 | | 188.27 |
| 8 | | 1215.3080 | 32.00000 | BACD18 | 193.65 |
| 9 | | −225.2786 | Space 1 | | 196.47 |
| 10 | | 232.9944 | 42.00000 | BACD18 | 214.80 |
| 11 | | −571.8435 | 0.48000 | | 214.60 |

TABLE 2-continued

| | | | | | |
|---|---|---|---|---|---|
| 12 | | 347.0329 | 32.80000 | BACD5 | 204.60 |
| 13 | | −429.4207 | 0.04000 | | 202.10 |
| 14 | | −428.1570 | 11.00000 | FD6 | 202.09 |
| 15 | | 163.6727 | 48.00000 | BSC7 | 184.47 |
| 16 | | −314.1584 | 7.00000 | | 183.55 |
| 17 | a | −468.2473 | 17.00000 | ACRYLIC | 179.73 |
| 18 | ac | −322.7600 | 79.09586 | | 180.15 |
| 19 | a | −101.3095 | 5.00000 | ACRYLIC | 147.00 |
| 20 | | −2731.2480 | Space 2 | | 156.00 |
| 21 | | ∞ | 7.00000 | BAC1 | 161.00 |
| 22 | | ∞ | 4.30000 | 420550 | 161.00 |
| 23 | | ∞ | 7.00000 | 539570 | 161.00 |
| 24 | | ∞ | 0.0 | | 162.00 |

Symbol Description

| | | |
|---|---|---|
| a | - | Polynomial asphere |
| c | - | Conic section |

Object and Image Surface

| Surface | Radius |
|---|---|
| Image | 3657.00 |

Conics

| Surface Number | Constant |
|---|---|
| 2 | 4.0000E+00 |
| 5 | −2.5000E+01 |
| 18 | −1.2000E+01 |

Even Polynomial Aspheres

| Surf. No. | D | E | F | G | H | I |
|---|---|---|---|---|---|---|
| 1 | 9.6035E−08 | −5.4951E−12 | 1.7300E−16 | 4.2606E−21 | −1.9314E−24 | 7.5004E−29 |
| 2 | 8.9656E−08 | 5.5927E−13 | −2.4936E−16 | 4.5669E−20 | 4.1155E−24 | −5.9595E−28 |
| 5 | −2.2151E−08 | −3.6015E−12 | 8.1074E−16 | 6.5546E−20 | −6.6674E−24 | 3.4103E−30 |
| 6 | 1.4294E−08 | 1.3153E−12 | 4.7500E−16 | 5.7685E−21 | −1.1578E−25 | −2.1265E−28 |
| 17 | 1.0488E−08 | −1.0919E−11 | −2.5443E−16 | −3.5170E−21 | 1.4947E−24 | 7.7832E−29 |
| 18 | 1.6872E−08 | −8.6191E−12 | −6.0153E−16 | 1.5494E−20 | 4.4859E−24 | −1.7395E−28 |
| 19 | 9.1806E−08 | 8.9085E−12 | −7.4104E−15 | 1.5734E−18 | −8.9131E−23 | −3.3942E−29 |

Variable Spaces

| Pos. | Space 1 T(9) | Space 2 T(20) |
|---|---|---|
| 1 | 22.000 | 3.520 |
| 2 | 20.400 | 2.940 |

| First-Order Data | Pos. 1 | Pos. 2 |
|---|---|---|
| f/number | 1.13 | 1.13 |
| Magnification | −0.0367 | −0.0320 |
| Object Height | −2100.0 | −2345.0 |
| Object Distance | −3603.7 | −4120.6 |
| Effective Focal Length | 131.64 | 131.51 |
| Overall Length | 4084.1 | 4598.8 |
| Forward Vertex Distance | 480.39 | 478.21 |
| Barrel Length | 480.39 | 478.21 |
| Stop Surface Number | 7 | 7 |
| Distance to Stop | 0.00 | 0.00 |
| Stop Diameter | 188.100 | 186.904 |
| Entrance Pupil Distance | 110.36 | 110.36 |
| Exit Pupil Distance | −140.79 | −139.46 |

First Order Properties of Elements

| Element Number | Surface Numbers | | Power | f' |
|---|---|---|---|---|
| 1 | 1 | 2 | −0.19981E−02 | −500.48 |
| 2 | 3 | 4 | −0.20071E−02 | −498.24 |
| 3 | 5 | 6 | 0.38928E−03 | 2568.9 |

TABLE 2-continued

| 4 | 8 | 9 | 0.33450E−02 | 298.95 |
| 5 | 10 | 11 | 0.37948E−02 | 263.52 |
| 6 | 12 | 13 | 0.30331E−02 | 329.70 |
| 7 | 14 | 15 | −0.69202E−02 | −144.50 |
| 8 | 15 | 16 | 0.46550E−02 | 214.82 |
| 9 | 17 | 18 | 0.49370E−03 | 2025.5 |
| 10 | 19 | 20 | −0.46902E−02 | −213.21 |

First-Order Properties of Doublets

| Element Numbers | Surface Numbers | | Power | f |
|---|---|---|---|---|
| 7 8 | 14 | 16 | −0.18505E−02 | −540.41 |

TABLE 3

| Example No. | $\Phi_0$ | $\Phi_1$ | $\Phi_2$ | $\Phi_3$ | $\Phi_{S1}$ | $\Phi_{S2}$ |
|---|---|---|---|---|---|---|
| 1 | 0.0095 | 0.0008 | 0.0053 | −0.0041 | −0.0056 | 0.0036 |
| 2 | 0.0076 | 0.0012 | 0.0049 | −0.0047 | −0.0038 | 0.0033 |

TABLE 4

| | Example 1 | Example 2 |
|---|---|---|
| f/number[1] | 0.99 | 1.13 |
| Total Field | 90° | 70° |
| Vignetting Losses | 29% | 22% |
| MTF[2] | >0.5 | >0.6 |

[1] at the CRT, finite conjugates
[2] at 10 cycles/mm through 0.85 of full field

What is claimed is:

1. A projection lens system for use with a cathode ray tube, said lens system having an overall optical power $\Phi_0$ consisting in order from its long conjugate to its short conjugate of:
   (a) a first lens unit having an optical power $\Phi_1$ and consisting in order from the lens system's long conjugate to its short conjugate of:
      a first lens subunit having an optical power $\Phi_{S1}$; and
      a second lens subunit having an optical power $\Phi_{S2}$;
   (b) a second lens unit having an optical power $\Phi_2$; and
   (c) a third lens unit which has an optical power $\Phi_3$, is associated with the cathode ray tube during use of the lens system, and provides correction to the field curvature of the lens system;
   wherein each of the first, second, and third lens units has at least one aspherical surface and wherein $\Phi_1$, $\Phi_{S1}$, $\Phi_{S2}$, $\Phi_2$, and $\Phi_3$ satisfy the following conditions:
   (i) $\Phi_1 > 0$;
   (ii) $\Phi_1/\Phi_0 < 0.3$;
   (iii) $\Phi_{S1} < 0$;
   (iv) $|\Phi_{S1}|/\Phi_0 > 0.4$;
   (v) $\Phi_{S2} > 0$;
   (vi) $\Phi_{S2}/\Phi_0 > 0.3$;
   (vii) $\Phi_2 > 0$;
   (viii) $\Phi_2/\Phi_0 > 0.4$; and
   (ix) $\Phi_3 < 0$.

2. The projection lens system of claim 1 wherein each of the first and second lens units comprises at least one plastic lens element and at least one glass lens element.

3. The projection lens system of claim 1 wherein the first lens subunit comprises a biconcave lens element made of glass.

4. The projection lens system of claim 1 wherein the first and second lens units are separated by an axial space which is varied during focusing of the lens system.

5. The projection lens system of claim 4 wherein the lens system is focusable over a range of conjugates of approximately ±7.5% from a center value of about 4 meters.

6. The projection lens system of claim 1 wherein the lens system has an f-number for a long conjugate of infinite length which is less than 1.0.

7. The projection lens system of claim 1 wherein the lens system has a half angle field of view in the direction of its long conjugate of at least 35 degrees.

8. The projection lens system of claim 1 wherein the lens system has a vignetting loss which is less than 30% at full field.

9. The projection lens system of claim 1 wherein the lens system has a maximum field and a modulation transfer function which is greater than 0.5 at 10 cycles per millimeter for any field position up to 0.85 of said maximum field.

10. The projection lens system of claim 1 wherein the lens system is color corrected over a wavelength range of 465 nanometers to 610 nanometers.

11. A projection television system comprising a cathode ray tube, a screen, and a projection lens system for projecting light from the cathode ray tube onto the screen to form an image, said projection lens system comprising the projection lens system of claim 1.

12. The projection television system of claim 11 wherein the projection lens system includes at least one plastic lens element and the combination of the cathode ray tube and the projection lens system is substantially athermalized.

13. The projection television system of claim 11 wherein the cathode ray tube has a diagonal of at least 160 millimeters.

14. A projection television system comprising three cathode ray tubes, a screen, and three projection lens systems, one projection lens system being associated with each of the cathode ray tubes for projecting light from that tube onto the screen to form an image, each projection lens system comprising the projection lens system of claim 1.

15. The projection television system of claim 14 wherein each projection lens system includes at least one plastic lens element and each combination of a cathode ray tube and a projection lens system is substantially athermalized.

16. The projection television system of claim 14 wherein each cathode ray tube has a diagonal of at least 160 millimeters.

17. A projection lens system for use with a cathode ray tube, said lens system having an overall optical power $\Phi_0$ and comprising in order from its long conjugate to its short conjugate:

(a) a first lens unit having an optical power $\Phi_1$ and comprising in order from the lens system's long conjugate to its short conjugate:
   a first lens subunit having an optical power $\Phi_{S1}$; and
   a second lens subunit having an optical power $\Phi_{S2}$;
(b) a second lens unit having an optical power $\Phi_2$; and
(c) a third lens unit which has an optical power $\Phi_3$, is associated with the cathode ray tube during use of the lens system, and provides correction to the field curvature of the lens system;

wherein each of the first, second, and third lens units has at least one aspherical surface, each of the first and second lens units comprises at least one plastic lens element and at least one glass lens element, and wherein $\Phi_1$, $\Phi_{S1}$, $\Phi_{S2}$, $\Phi_2$, and $\Phi_3$, satisfy the following conditions:
(i) $\Phi_1 > 0$;
(ii) $\Phi_1/\Phi_0 < 0.3$;
(iii) $\Phi_{S1} < 0$;
(iv) $|\Phi_{S1}|/\Phi_0 > 0.4$;
(v) $\Phi_{S2} > 0$;
(vi) $\Phi_{S2}/\Phi_0 > 0.3$;
(vii) $\Phi_2 > 0$;
(viii) $\Phi_2/\Phi_0 > 0.4$; and
(ix) $\Phi_3 < 0$.

18. The projection lens system of claim 17 wherein the first lens subunit comprises a bi-concave lens element made of glass.

19. The projection lens system of claim 17 wherein the first and second lens units are separated by an axial space which is varied during focusing of the lens system.

20. A projection television system comprising three cathode ray tubes, a screen, and three projection lens systems, one projection lens system being associated with each of the cathode ray tubes for projecting light from that tube onto the screen to form an image, each projection lens system comprising the projection lens system of claim 17.

* * * * *